United States Patent
Toyama

(10) Patent No.: US 6,776,537 B2
(45) Date of Patent: Aug. 17, 2004

(54) LIGHT SOURCE-OPTICAL FIBER COUPLER

(75) Inventor: Minoru Toyama, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 1 day.

(21) Appl. No.: 09/983,395

(22) Filed: Oct. 24, 2001

(65) Prior Publication Data

US 2002/0076174 A1 Jun. 20, 2002

(30) Foreign Application Priority Data

Oct. 26, 2000 (JP) .................................. P2000-326471

(51) Int. Cl.$^7$ ........................... G02B 6/42; G02B 6/32; G02B 3/02
(52) U.S. Cl. ........................... 385/93; 385/33; 359/652
(58) Field of Search .................... 359/652–654; 385/33, 93, 34; 372/6, 109

(56) References Cited

U.S. PATENT DOCUMENTS

| 4,969,702 A | * 11/1990 | Anderson | 385/33 |
| 5,046,798 A | * 9/1991 | Yagiu et al. | 385/34 |
| 5,087,109 A | * 2/1992 | Ishizuka et al. | 385/34 |
| 5,351,330 A | * 9/1994 | Jongewaard | 385/93 |

FOREIGN PATENT DOCUMENTS

| JP | A-61-107207 | 5/1986 |
| JP | 2000-221445 | 8/2000 | ........... G02B/27/18 |

OTHER PUBLICATIONS

Melles Griot "The Practical Application of Light" Optics Guide and Catalog, 1999–2000 edition, pp. 101, 1.3, 1.6–1.7, 1.11–1.15, 1.23–1.24.*
U.S. patent application Ser. No. 10/208,815, Toyama, filed Aug. 1, 2002.

* cited by examiner

Primary Examiner—Edward J. Glick
Assistant Examiner—Krystyna Suchecki
(74) Attorney, Agent, or Firm—Whitham, Curtis & Christofferson, P.C.

(57) ABSTRACT

A light source-optical fiber coupler using a gradient index rod lens 12 by which a diffused luminous flux emitted from a light source (for example, a semiconductor laser 10) is coupled onto an end surface of an optical fiber (for example, a single-mode optical fiber 14). The gradient index rod lens has a planar end surface facing the light source, and a convex spherical end surface facing the optical fiber. The gradient index rod lens has a light source side numerical aperture $NA_2$ in a range of from 0.40 to 0.75, an effective lens radius $r_0$ in a range of from 0.3 to 1.0 mm, and a spherical curvature radius $R_1$ in a range of from 1.2 to 2.0 mm.

12 Claims, 4 Drawing Sheets

0.976mm 0.976mm

LIGHT SOURCE-OPTICAL FIBER COUPLER

BACKGROUND OF THE INVENTION

The present invention relates to a light source-optical fiber coupler for coupling light emitted from a light source onto an end surface of an optical fiber by a gradient index rod lens and particularly to a light source-optical fiber coupler in which a light source and a gradient index rod lens having a planar end surface facing the light source and a spherical end surface facing an optical fiber are arranged closely to each other to thereby make it possible to reduce the size of the coupler.

In an optical communication system or the like, a lens is used so that a diffused luminous flux emitted from a light source such as a semiconductor laser or the like is transmitted to an optical fiber core by the lens. Heretofore, a spherical lens, an aspherical lens, a gradient index rod lens, or the like, has been used as the lens to perform optical coupling.

The spherical lens can be produced most inexpensively but is insufficient from the point of view of a characteristic to optically couple a semiconductor laser to a single-mode optical fiber with low loss. This is because the core diameter of the single-mode optical fiber is so small that strict performance is required of the aberration of the lens in order to improve optical coupling efficiency Therefore, an aspherical lens is generally used as a highly coupled lens.

On the other hand, when a gradient index rod lens is used, the rod lens is used in the condition a semiconductor laser side end surface of the rod lens is provided as a convex spherical surface and an optical fiber side end surface of the rod lens is provided as a planar surface because a high numerical aperture (NA) is required for coupling of light emitted from the semiconductor laser (see JP-A-61-107207). This is based on the idea that light-condensing power is obtained by the convex spherical surface while the aberration generated in the convex spherical surface is cancelled by the refractive-index distribution shape of the rod lens.

In order to produce an aspherical lens, however, a mold was required in accordance with the kind of the aspherical lens. A heat-resistant material and superfine machining were required for the production. Hence, there was a problem that the cost of the lens increased particularly in the case of multikind and small quantity production.

On the other hand, in the case of a gradient index rod lens having a convex spherical surface on a semiconductor laser side, it was difficult to produce a high numerical aperture lens because the controllable range of the refractive-index distribution was narrow. Moreover, the lens length of the rod lens became long, so that the material cost for the lens increased.

SUMMARY OF THE INVENTION

An object of the present invention is to provide a light source-optical fiber coupler which can couple a semiconductor laser to a single-mode optical fiber with low loss and which can be produced as a small-size coupler inexpensively and easily.

A subject of the present invention is a light source-optical fiber coupler using a gradient index rod lens for coupling a diffused luminous flux emitted from a light source onto an end surface of an optical fiber. Here, the gradient index rod lens has a planar end surface on the light source side, and a convex spherical end surface on the optical fiber side. The gradient index rod lens has a light source side numerical aperture $NA_2$ in a range of from 0.40 to 0.75, an effective lens radius $r_0$ in a range of from 0.3 to 1.0 mm, and a spherical curvature radius $R_1$ in a range of from 1.2 to 2.0 mm.

In the present invention, a semiconductor laser is generally used as the light source. When a single-mode optical fiber having a small diameter is used as the optical fiber which is a partner of optical coupling, the highly efficient optical coupling effect is particularly remarkable. In the present invention, the planar surface is used on the semiconductor laser side and the convex spherical surface is used on the optical fiber, so that high numerical aperture is attained and the aberration of light can be corrected by the refractive-index distribution shape of the rod lens. Hence, reduction in size of an optical module can be achieved when such a gradient index rod lens having a small lens diameter is used.

Preferably, the gradient index rod lens used in the present invention has a center axis refractive index $n_0$ in a range of from 1.5 to 1.8, a value of $n_0 \cdot g \cdot r_0$ in a range of from 0.40 to 0.65 (in which a is a secondary refractive-index distribution coefficient), and a value of $Z/R_1$ in a range of from 1.1 to 2.5 (in which Z is the lens length of the rod lens) . Preferably, the gradient index rod lens has a value of g in a range of from 0.38 to 0.50, a value of $h_4$ in a range of from −0.2 to 1.8, a value of $h_6$ in a range of from −0.5 to 10, and a value of $h_8$ in a range of from −25 to 45 (in which $h_4$, $h_6$ and $h_8$ are higher-order refractive-index distribution coefficients respectively).

A practical optical module structure may be preferably configured as follows. A semiconductor laser is used as the light source. A chip of the semiconductor laser and the gradient index rod lens are retained in a housing in the condition that they are arranged closely to each other. The housing is provided so that a ferrule of an optical plug which is used as a mating partner and in which a single-mode optical fiber is retained can be fitted and retained in the housing.

The present disclosure relates to the subject matter contained in Japanese patent application No. 2000-326471 (filed on Oct. 26, 2000), which is expressly incorporated herein by reference in its entirety.

DESCRIPTION OF THE PREFERRED EMBODIMENT

Figure 1:
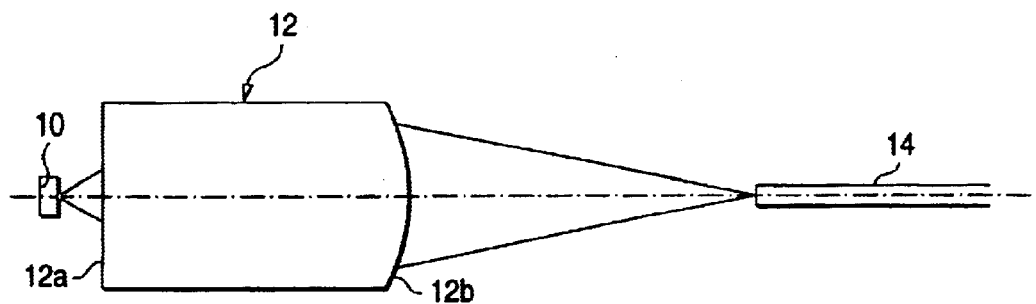
FIG. 1 is a basic configuration view of a light source-optical fiber coupler according to the present invention.

FIG. 1 is a basic configuration view of alight source-optical fiber coupler according to the present invention. Light (diffused luminous flux) emitted from a semiconductor laser (laser diode) 10 is coupled onto an end surface of a single-mode optical fiber 14 by a gradient index rod lens 12. Here, the gradient index rod lens 12 has a planar end surface 12a on the light source side, and a convex spherical end surface 12b on the optical fiber side. The gradient index rod lens 12 is arranged in accordance with the directions of the end surfaces 12a and 12b. The gradient index rod lens 12 has a light source side numerical aperture $NA_2$ in a range of from 0.40 to 0.75, an effective lens radius $r_0$ in range of from 0.3 to 1.0 mm, and a spherical curvature radius $R_1$ in a range of from 1.2 to 2.0 mm.

The reason why the semiconductor laser side numerical aperture $NA_2$ is set to be in a range of from 0.40 to 0.75 is that the rod lens is adapted for the characteristic of the semiconductor laser. The reason why the effective lens radius $r_0$ is set to be in a range of from 0.3 to 1.0 mm is that the diameter of the rod lens is reduced as much as possible and that 0.3 mm is approximately a limit for forming a spherical surface. The spherical curvature radius $R_1$ is set to be in a range of from 1.2 to 2.0 mm in accordance with the effective lens radius $r_0$.

Incidentally, the radial refractive-index distribution of the gradient index rod lens is given by the expression:

$$n(r)^2 = n_0^2 \cdot \{1 - (g \cdot r)^2 + h_4 (g \cdot r)^4 + h_6 (g \cdot r)^6 + h_8 (g \cdot r)^8 + \ldots \}$$

in which r is the distance from the center axis, n(r) is the refractive index in the position having the distance r from the center axis, $n_0$ is the refractive index on the center axis, g is the secondary refractive-index distribution coefficient, and $h_4$, $h_6$, $h_5$ ... are higher-order refractive-index distribution coefficients respectively.

In the present invention, preferably, the gradient index rod lens has a center axis refractive index $n_0$ in a range of from 1.5 to 1.8, a value of $n_0 \cdot g \cdot r_0$ in a range of from 0.40 to 0.65, and a value of $Z/R_1$ in a range of from 1.1 to 2,5. Preferably, the gradient index rod lens has a value of a in a range of from 0.38 to 0.50, a value of $h_4$ in a range of from −0.2 to 1.8, a value of $h_6$ in a range of from −0.5 to 10, and a value of $h_8$ in a range of from −25 to 45. These numerical value ranges are deduced from a result of design calculation which will be described later.

Figure 2:
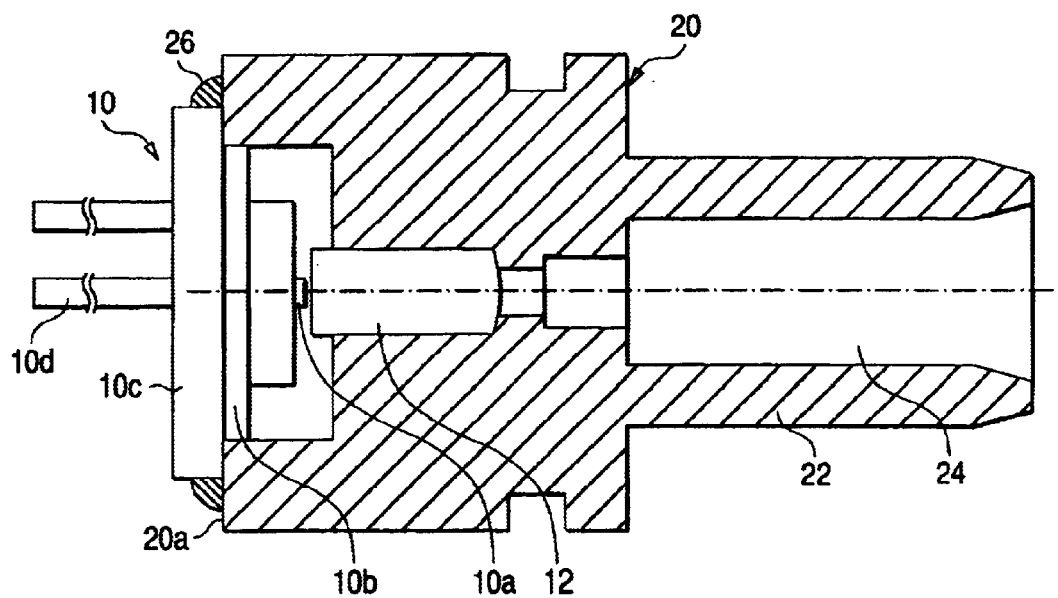
FIG. 2 is a structural explanatory view showing a specific example of the light source-optical fiber coupler according to the present invention.

FIG. 2 shows a specific example of the light source-optical fiber coupler. A laser chip and a gradient index rod lens are retained in a housing in the condition that they are arranged closely to each other upon the assumption that a semiconductor laser (laser diode chip) without any cover glass is used for the purpose of making the semiconductor laser side numerical aperture $NA_2$ as large as possible.

The light source-optical fiber coupler has a semiconductor laser 10, a gradient index rod lens 12, and a housing 20 for retaining the semiconductor laser 10 and the rod lens 12 and for fittingly retaining a ferrule (not shown) of an optical plug which is a mating partner. The light source-optical fiber coupler has a receptacle type structure in which the semiconductor laser 10 is optically coupled with a single-mode optical fiber retained in the ferrule by the gradient index rod lens 12 when the optical plug is mated to the housing 20.

As described above, the semiconductor laser 10 has a structure in which there is no cover glass A laser chip (device body) 10a is mounted on a chip carrier (heat sink) 10b. The chip carrier 10b is attached onto a base portion 10c. Lead wires 10d pass through the base portion 10c. Hence, the gradient index rod lens can be arranged extremely closely to the laser chip 10a which is a light-emitting point.

Here, the housing 20 is an integral molding of resin in which a plurality of holes different in inner diameter are serially spliced along aligned center axes to thereby form a through-hole structure. The semiconductor laser 10 is retained in one end portion 20a (left end portion in FIG. 2) of the housing 20. The gradient index rod lens 12 is inserted in a nearly center portion of the inside of the housing 20. A receptacle portion 22 is formed in a range of from the vicinity of the center of the housing 20 to the other end portion (right end portion in FIG. 2) of the housing 20. The receptacle portion 22 is a portion having a bore (cavity) 24 in which the ferrule of the optical plug as a mating partner can be just fitted.

As described above, the gradient index rod lens 12 incorporated in the light source-optical fiber coupler has a planar end surface on the semiconductor laser side, and a convex spherical end surface on the optical fiber side. The semiconductor laser side end surface of the rod lens 12 is arranged closely to the light-emitting point of the laser chip (for example, a distance between the laser chip and the lens is preferably in a range of 0.1 mm to 0. 5 mm and in this embodiment the distance is about 0.2 mm). In the condition that the gradient index rod lens 12 is inserted in the through-hole, the peripheral of the rod lens 12 is fixed by an adhesive agent or the like.

The semiconductor laser 10 is center-aligned and coupled to the housing 20 in which the gradient index rod lens 12 is incorporated as described above. In the condition that the ferrule of the optical plug is attached into the receptacle portion 22 of the housing 20, the semiconductor laser 10 is combined with the housing 20 so that the base portion 10c of the semiconductor laser 10 abuts on an end portion 20a of the housing 20. Center alignment is performed while light emitted from the semiconductor laser 10 is monitored by the single-mode optical fiber of the optical plug The peripheral of the base portion 10c is fixed by a resin adhesive agent 26 in the condition that the semiconductor laser 10 is positioned.

EXAMPLE

The distance $L_2$ between a laser chip and an end surface of a gradient index rod lens is set to 0.2 mm ($L_2$=0.2 mm) upon the assumption that a semiconductor laser without any cover glass is used in order to take the semiconductor laser side numerical aperture $NA_2$ as large as possible. The single-mode optical fiber side numerical aperture $NA_1$ is set to 0.15, and the distance $L_1$ between the lens and an end surface of the optical fiber is set to 4.5 mm ($L_1$=4.5 mm)—(As a result, the effective radius $r_0$ of the lens is about 0.68 mm.)

The designing procedure is as follows. While a refractive index $n_0$ on the center axis of the gradient index rod lens and a secondary refractive-index distribution coefficient g were given and the spherical curvature radius in the end surface of the lens was changed, optimization was performed to minimize the aberration of light rays. In this manner, the lens length Z, the higher-order refractive-index distribution coefficients $h_4$, $h_6$ and $h_8$ and the semiconductor laser side numerical aperture $NA_2$ were obtained.

Figure 3A:
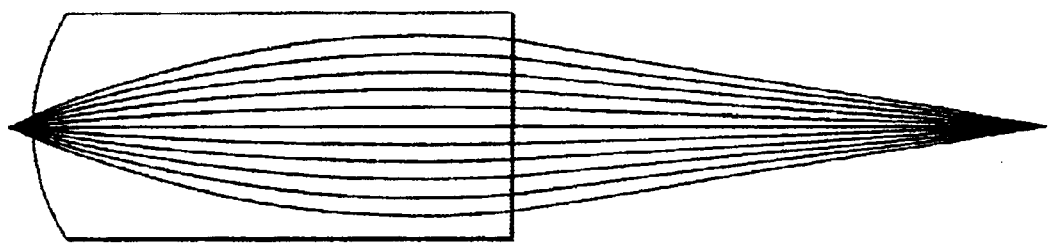
FIGS. 3A and 3B are views for explaining tracing of real light rays in design examples.
Figure 3B:
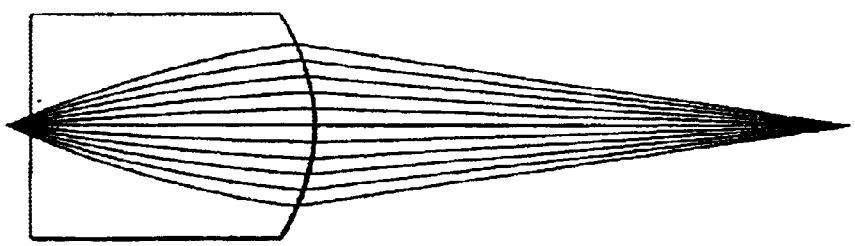

Design examples are shown in Table 1 and FIGS. 3A and 3B. In these examples, the effective lens radius $r_0$, the center axis refractive index no and the secondary refractive-index distribution coefficient were set to be $r_0$=0.7 mm, $n_0$=1.636 and g=0.43 (1/mm) respectively. In Table 1, Example 00 shows a comparative example in which planar surfaces are provided at opposite ends of the lens, Examples 11 to 15 show background-art examples in which a convex spherical surface is provided at the semiconductor laser side end of the lens, and Examples 21 to 25 show examples according to the present invention in which a convex spherical surface is provided at the optical fiber side end of the lens. Incidentally, FIG. 3A shows the background-art case (equivalent to Example 13 in Table 1) where a convex spherical surface is provided at the semiconductor laser side end of the lens. FIG. 3B shows the present invention case (equivalent to Example 25 in Table 1) where a convex spherical surface is provided at the optical fiber side end of the lens. It is apparent from Table 1 that the lens length Z can he shortened according to the present invention.

TABLE 1

| Example | $R_1$ (nm) | $R_2$ (mm) | Z (mm) | $NA_3$ | $h_4$ | $h_4$ | $h_8$ |
|---|---|---|---|---|---|---|---|
| 00 | 0 | 0 | 4.039 | 0.485 | 0.5711 | 1.478 | −13.20 |
| 11 | 0 | −2.0 | 4.018 | 0.526 | 0.6063 | 1.722 | −14.13 |
| 12 | 0 | −1.8 | 4.015 | 0.532 | 0.6113 | 1.760 | −14.20 |
| 13 | 0 | −1.6 | 4.011 | 0.539 | 0.6179 | 1.821 | −14.31 |
| 14 | 0 | −1.4 | 4.007 | 0.549 | 0.6269 | 1.906 | −14.38 |
| 15 | 0 | −1.2 | 4.002 | 0.565 | 0.6401 | 2.035 | −14.27 |
| 21 | 2.0 | 0 | 3.013 | 0.487 | 0.2105 | 0.5975 | −5.384 |
| 22 | 1.8 | 0 | 2.899 | 0.493 | 0.2085 | 0.6355 | −5.751 |
| 23 | 1.6 | 0 | 2.760 | 0.502 | 0.2416 | 0.7041 | −5.565 |
| 24 | 1.4 | 0 | 2.587 | 0.517 | 0.3531 | 1.298 | −6.315 |
| 25 | 1.2 | 0 | 2.369 | 0.541 | 0.6729 | 3.337 | −2.058 |

Figure 4:
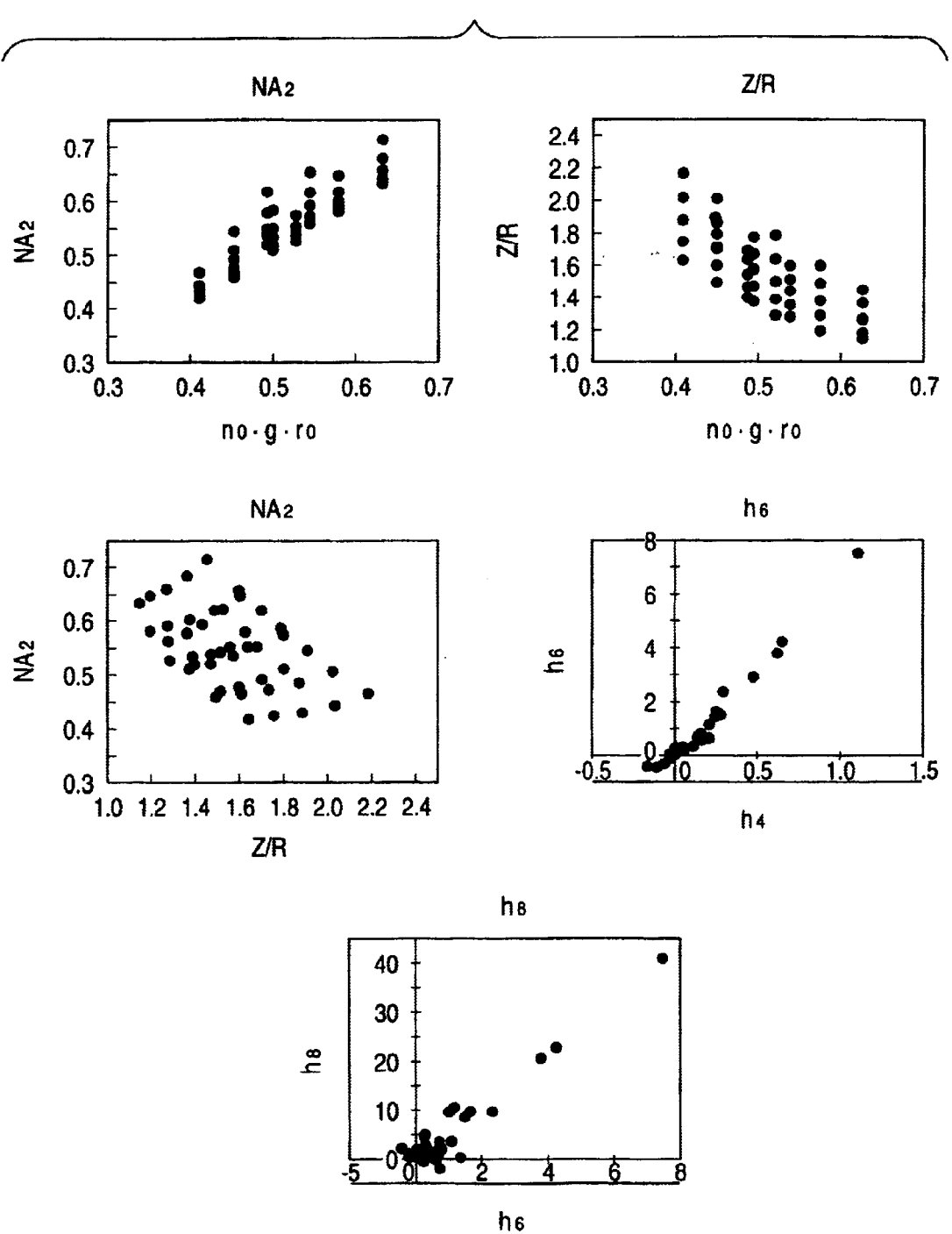
FIG. 4 is explanatory graphs showing the relations among $n_0 \cdot g \cdot r_0$, $Z/R_1$ and $NA_2$ and the relations among $h_4$, $h_6$ and $h_8$ in the case of $NA_1$=0.10.
Figure 5:
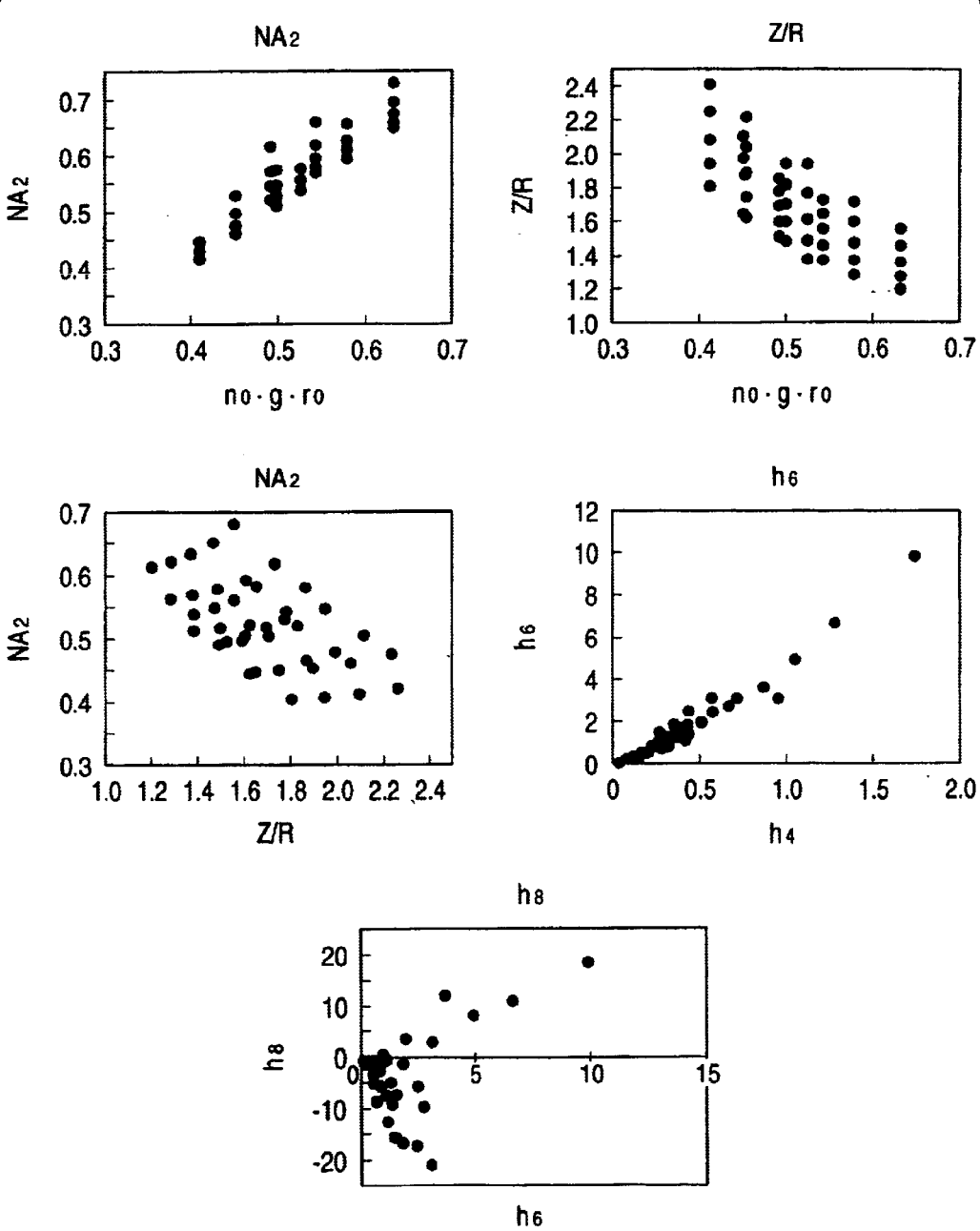
FIG. 5 is explanatory graphs showing the relations among $n_0 \cdot g \cdot r_0$, $Z/R_1$ and $NA_2$ and the relations among $h_4$, $h_6$, and $h_8$ in the case of $NA_1$=0.15.

Then, to determine effective numerical value ranges, designing calculation was performed while the optical fiber side numerical aperture $NA_1$ was changed to the two values of 0.1 and 0.15, the center axis refractive index no was changed in a range of from 1.5 to 1.8 and the secondary refractive-index distribution coefficient g was changed in a range of from 0.389 to 0.500. The relations among $n_0 \cdot g \cdot r_0$, $Z/R_1$ and $NA_2$ and the relations among $h_4$, $h_6$, and $h_8$ obtained as results of the designing calculation are shown in FIGS. 4 and 5. Incidentally, FIG. 4 shows the case of $NA_1$=0.10, and FIG. 5 shows the case of $NA_1$=0.15.

It is apparent from these designing calculation results that the light source side numerical aperture $NA_2$ is in a range of from 0.40 to 0.75, $n_0 \cdot g \cdot r_0$ is in a range of from 0.40 to 0.65, $Z/R_1$ is in a range of from 1.1 to 2.5, $h_4$ is in a range of from −0.2 to 1.8, $h_6$ is in a range of from −0.5 to 10, and $h_8$ is in a range of from −25 to 45.

[Effect of the Invention]

As described above, the present invention provides a light source-optical fiber coupler having a gradient index rod lens which has a planar end surface facing a light source, and a convex spherical end surface facing an optical fiber and which has a light source side numerical aperture, an effective lens radius, a spherical curvature radius, etc. set to be in defined ranges respectively. Hence, the angle between the spherical surface and light rays becomes smaller than that in the case where a convex spherical surface is provided at the semiconductor laser side end of the lens Hence, the spherical aberration generated is reduced, so that the aberration can be corrected easily. Hence, the controllable range of the refractive-index distribution is widened, so that a high numerical aperture lens can be produced easily.

Because not an aspherical surface but a spherical surface can be used in the present invention, a spherical surface-forming method heretofore used can be used. Hence, because no pressed lens is required, mass production can be made easily and inexpensively. Moreover, because the lens length is shortened, the material cost is low. Hence, there can be provided a light source-optical fiber coupler which can couple a semiconductor laser to a single-mode optical fiber with low loss (efficiently) and which can be produced as a small-size coupler inexpensively.

What is claimed is:

1. A light source-optical fiber coupler comprising:
   a light source;
   an optical fiber; and
   a gradient index rod lens for coupling a diffused luminous flux emitted from said light source to an end surface of said optical fiber,
   wherein said gradient index rod lens has a planar end surface facing said light source, and a convex spherical end surface facing said optical fiber, and
   wherein said gradient index rod lens has a light source side numerical aperture $NA_2$ in a range of from 0.40 to 0.75, an effective lens radius $r_0$ in a range of from 0.3 to 1.0 mm, and a spherical curvature radius $R_1$ in a range of from 1.2 to 2.0 mm.

2. A light source-optical fiber coupler according to claim 1, wherein said gradient index rod lens has a center axis refractive index $n_0$ in a range of from 1.5 to 1.8, a value of $n_0 \cdot g \cdot r_0$ in the range of from 0.40 to 0.65 (in which g is a secondary refractive-index distribution coefficient), and a value of $Z/R_1$ in a range of from 1.1 to 2.5 (in which Z is a lens length).

3. A light source-optical fiber coupler according to claim 2, wherein said gradient index rod lens has a value of g in a range of from 0.38 to 0.50, a value of $h_4$ in a range of from −0.2 to 1.8, a value of $h_6$ in a range of from −0.5 to 10, and a value of $h_8$ in a range of from −25 to 45 (in which $h_4$, $h_6$ and $h_8$ are higher-order refractive-index distribution coefficients respectively).

4. A light source-optical fiber coupler according to claim 3, further comprising a housing, wherein:
   a semiconductor laser is used as a light source;
   a chip of said semiconductor laser and said gradient index rod lens are retained in said housing in a condition that said laser chip and said rod lens are arranged closely to each other; and
   said housing forms a structure in which a ferrule of an optical plug provided as a mating partner and having a single-mode optical fiber retained therein can be fitted and retained in said housing.

5. A light source-optical fiber coupler according to claim 2, further comprising a housing, wherein:
   a semiconductor laser is used as a light source;
   a chip of said semiconductor laser and said gradient index rod lens are retained in said housing in a condition that said laser chip and said rod lens are arranged closely to each other; and
   said housing forms a structure in which a ferrule of an optical plug provided as a mating partner and having a single-mode optical fiber retained therein can be fitted and retained in said housing.

6. A light source-optical fiber coupler according to claim 1, further comprising a housing, wherein:
   a semiconductor laser is used as a light source;
   a chip of said semiconductor laser and said gradient index rod lens are retained in said housing in a condition that said laser chip and said rod lens are arranged closely to each other; and
   said housing forms a structure in which a ferrule of an optical plug provided as a mating partner and having a single-mode optical fiber retained therein can be fitted and retained in said housing.

7. A light source-optical fiber coupler according to claim 1, wherein said light source, said gradient index rod lens and said optical fiber are aligned along an axis of said light source-optical fiber coupler.

8. An optical coupler module comprising:
a housing having a receptacle for holding an optical fiber;
a laser diode chip accommodated within said housing; and
a gradient index rod lens held by and accommodated withing said housing, said gradient index rod lens having a planar end surface facing said laser diode chip, and a convex spherical surface facing said receptacle, wherein:
a distance between said laser diode chip and said planar end surface of said gradient index rod lens is in a range of from 0.1 to 0.5 mm.

9. An optical module according to claim 8, wherein said distance is about 0.2 mm.

10. An optical coupler module according to claim 8, wherein said light source, said gradient index rod lens and said optical fiber are aligned along an axis of said housing.

11. An optical coupler module according to claim 10, wherein said light source, said gradient index rod lens and said optical fiber are aligned by serial holes in said housing forming a through-hole structure.

12. A gradient index rod lens for coupling a diffused luminous flux emitted from a light source to an end surface of an optical fiber, wherein:
said gradient index rod lens has a planar end surface, and a convex spherical end surface, and
wherein said gradient index rod lens has a planar end surface side numerical aperture $NA_2$ in a range of from 0.40 to 0.75, an effective lens radius $r_0$ in a range of from 0.3 to 1.0 mm, and a spherical curvature radius $R_1$ in a range of from 1.2 to 2.0 mm.

* * * * *